(12) United States Patent
Meic

(10) Patent No.: US 7,318,506 B1
(45) Date of Patent: Jan. 15, 2008

(54) FREE PISTON ENGINE WITH LINEAR POWER GENERATOR SYSTEM

(76) Inventor: Vladimir Meic, 5211, 5000 Somervale Court SW, Calgary (CA) T1Y 4M1

(*) Notice: Subject to any disclaimer, the term of this patent is extended or adjusted under 35 U.S.C. 154(b) by 0 days.

(21) Appl. No.: 11/532,949

(22) Filed: Sep. 19, 2006

(51) Int. Cl.
*F02B 71/00* (2006.01)

(52) U.S. Cl. ..................................... 190/1 A; 123/46 R

(58) Field of Classification Search ................. 290/1 A
See application file for complete search history.

(56) References Cited

U.S. PATENT DOCUMENTS

| | | | |
|---|---|---|---|
| 1,785,643 A * | 12/1930 | Noack et al. ................ | 290/4 R |
| 3,234,395 A * | 2/1966 | Colgate ....................... | 290/1 R |
| 3,629,596 A | 12/1971 | Wills | |
| 3,675,031 A | 7/1972 | Lavigne | |
| 4,489,554 A * | 12/1984 | Otters ......................... | 60/518 |
| 4,532,431 A | 7/1985 | Iliev et al. | |
| 5,002,020 A | 3/1991 | Kos | |
| 5,893,343 A | 4/1999 | Rigazzi | |
| 6,181,110 B1 | 1/2001 | Lampis | |
| 6,199,519 B1 * | 3/2001 | Van Blarigan ............ | 123/46 R |
| 6,707,175 B2 | 3/2004 | Rigazzi | |
| 6,748,907 B2 * | 6/2004 | Malmquist et al. ....... | 123/46 E |
| 6,914,351 B2 * | 7/2005 | Chertok ....................... | 310/12 |
| 6,932,030 B2 * | 8/2005 | Perlo et al. ................ | 123/46 R |
| 6,945,202 B2 | 9/2005 | Kaneko et al. | |
| 6,953,010 B1 | 10/2005 | Hofbauer | |
| 2005/0081804 A1 | 4/2005 | Graf et al. | |

FOREIGN PATENT DOCUMENTS

| | | |
|---|---|---|
| EP | 0185656 B1 | 5/1989 |
| WO | WO 01/58211 A2 | 8/2001 |
| WO | WO 03/069142 A1 | 8/2003 |
| WO | WO 2005/100764 A1 | 10/2005 |

* cited by examiner

*Primary Examiner*—Joseph Waks
(74) *Attorney, Agent, or Firm*—Bay Area Patent Group; Stephen Lewellyn

(57) ABSTRACT

A free piston engine with a linear power generation system with a variable stroke piston and improved construction and control is provided. The free piston engine includes a single double-ended piston located within a cylinder having opposed combustion chambers positioned at opposite ends of the cylinder. The piston is reciprocated within the cylinder between the opposed combustion chambers. The piston stroke is variably adjustable via the combustion cycles of the free piston engine and the linear power generation system such that the top dead centers of each side of the piston are definable. The piston stroke can then be adjusted to meet the optimum working conditions for a respective application.

20 Claims, 5 Drawing Sheets

FREE PISTON ENGINE WITH LINEAR POWER GENERATOR SYSTEM

FIELD OF THE INVENTION

The present invention relates generally to free piston engines and linear power generators. More particularly, relating to a free piston engine with a linear power generator having an improved construction and control system where piston stroke is variable.

DESCRIPTION OF THE RELATED ART

Free piston devices with power generators are known, for example from U.S. Pat. No. 3,629,596, U.S. Pat. No. 3,675,031, U.S. Pat. No. 4,154,200, U.S. Pat. No. 6,953,010, U.S. Pat. No. 6,181,110, and U.S. Pat. No. 6,707,175. Generally, such devices convert the mechanical energy of a reciprocating piston device into electrical energy through various constructs of linear alternators or generators. Such generators can be permanent magnet generators, reluctance generators, linear DC generators, and two and three-coil induction generators. The efficiency of a free piston linear power generator is highly dependent on the design of the free piston engine, the linear generator, and the control and synchronization of the motion of the piston device with the magnetic field of the generator.

SUMMARY OF THE INVENTION

In accordance with the invention, a universally applicable free piston engine with a linear power generation system having an improved construction and control is provided. In accordance with the invention, the free piston engine includes a single double-ended piston located within a cylinder having opposed combustion chambers positioned at opposite ends of the cylinder. The piston is reciprocated within the cylinder between the opposed combustion chambers. The piston stroke is variably adjustable via the combustion cycles of the free piston engine and the linear power generation system such that the top dead centers of each side of the piston are definable. The piston stroke can then be adjusted to meet the optimum working conditions for a respective application.

In general, in one aspect, a free piston engine with a liner power generating system is provided and includes a housing having a cylinder and first and second combustion chambers at opposed ends of the cylinder. A piston having opposed first and second ends is contained within the cylinder with the first end facing the first combustion chamber and the second end facing the second combustion chamber. The piston is capable of being axially reciprocated between the first and second combustion chambers. The piston is of a material that is permeable to magnetic flux and is electrically insulative. A first coil being carried by the piston and arranged coaxially therewith. A second coil surrounding the cylinder and being coaxially aligned therewith. A source of external electric current at least intermittently connected to the second coil. Combustion is effected in the first and second combustions chambers in an alternating pattern to cause the piston to reciprocate within the cylinder, thereby generating electric current in the second coil.

There has thus been outlined, rather broadly, the more important features of the invention in order that the detailed description thereof that follows may be better understood and in order that the present contribution to the art may be better appreciated.

Numerous objects, features and advantages of the present invention will be readily apparent to those of ordinary skill in the art upon a reading of the following detailed description of presently preferred, but nonetheless illustrative, embodiments of the present invention when taken in conjunction with the accompanying drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DETAILED DESCRIPTION OF THE INVENTION

Figure 1:
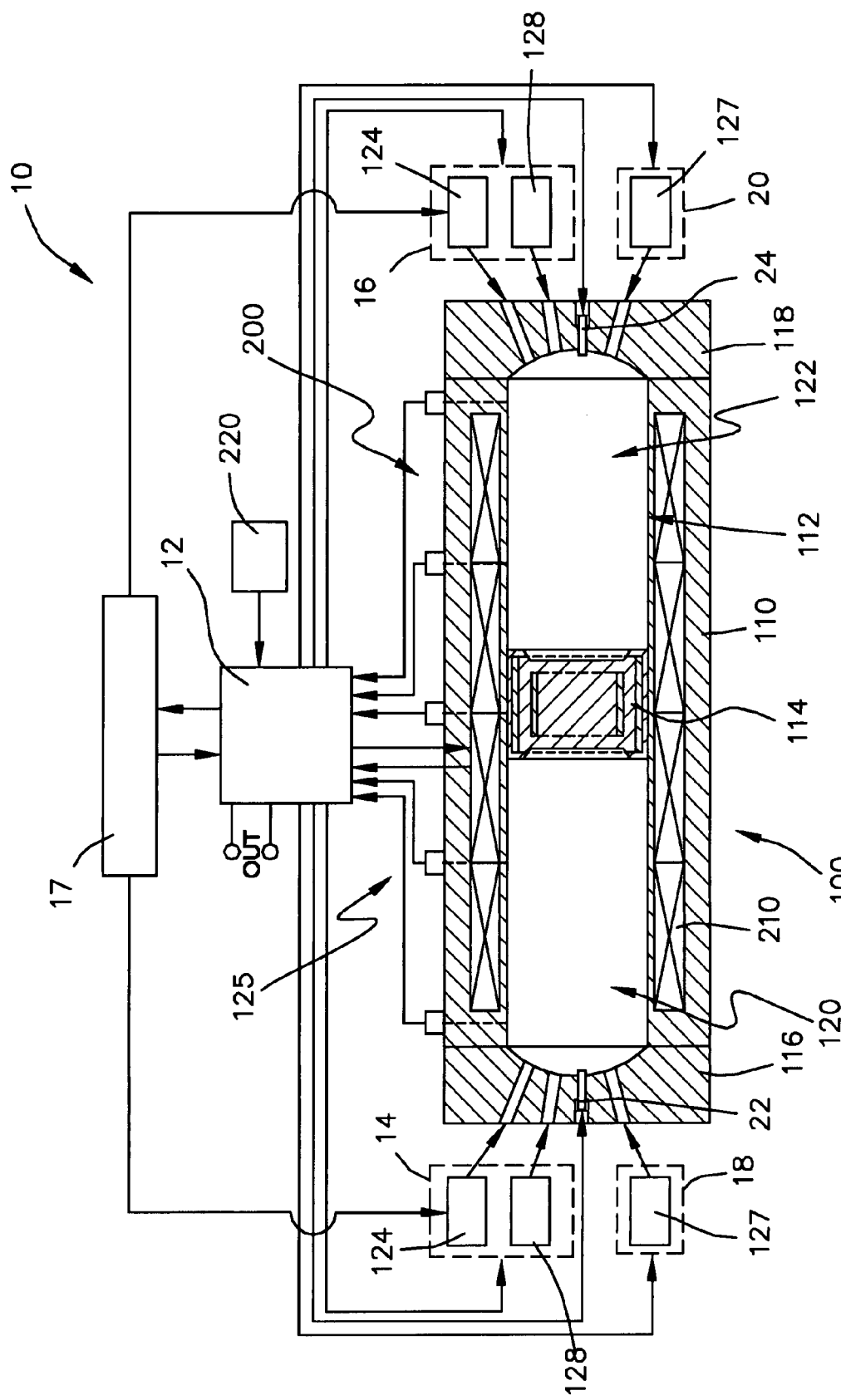
FIG. 1 is a schematic partial cross sectional view of the free piston engine with linear power generation system constructed in accordance with the principles of the present invention.

With reference to FIG. 1, a schematic cross sectional view of a free piston engine with a linear power generation system constructed in accordance with the present invention is shown. The power generation system 10 includes a free piston engine 100 that is integrated into the power generation system. The power generation system 10 further includes a linear motor generator 200, an electronic control unit (ECU) 12, first and second feeding units 14 and 16; first and second exhaust units 18 and 20; and first and second ignition plugs 22 and 24 as ignition units. The ECU 12 executes an overall control for the power generation system 10, i.e. for the free piston engine 100, the linear motor generator 200, the first and second feeding units 14 and 16, the first and second exhaust units 18 and 20, and the first and second ignition plugs 22 and 24.

The free piston engine 100 includes a housing 110 having an axial cylinder 112 into which is placed a free piston 114 for reciprocation therewithin. First and second head units 116 and 118 are attached to or formed integral with the housing at opposite ends and cover the open ends of the cylinder 112. The first and second head units 116 and 118 along with the opposed ends of the cylinder define first and second combustion chambers 120 and 122 respectively. More specifically, the first combustion chamber 120 is defined by the space surrounded by a first end of the piston 114, the inside wall surface of the housing 110 forming the cylinder 112 and the inward facing surface of the first head unit 116 that is within the periphery of the inside wall surface of the cylinder. The second combustion chamber 122 is defined by the space surrounded by a second end of the piston 114, which is opposite the first end thereof, the inside wall surface of the housing 110 forming the cylinder 112, and the inward facing surface of the second head unit 118 that is within the periphery of the inside wall surface of the cylinder. The piston 114 is a double-ended piston and is capable of being axially reciprocated in the cylinder 112 between the first and second combustion chambers 120 and 122. The piston 114 is free from attachment to any mechanical mechanisms such as a crank arm, shaft or the like. Further, the piston 114 is constructed from composite materials permitting the piston to be lightweight providing faster response, better linear speed and a high reciprocation rate.

Each feeding unit 14 and 16 operates to deliver compressed air from a source of compressed air 17 having a known pressure and fuel through the first and second head units 116 and 118 into the first and second combustion chambers 120 and 122 respectively. The ECU 12 operates each feeding unit 14 and 16 to control the timing and the delivery of an appropriate volume of compressed air and quantity of fuel to each combustion chamber 120 and 122. Each feeding unit 14 and 16 can deliver compressed air and fuel to each combustion chamber 120 and 122 independently, i.e. compressed air can be fed without fuel and fuel can be fed without compressed air. In this manner, the ECU 12 can control the timing and air-fuel mixture that is delivered into each combustion chamber 120 and 122. Further, which will be described in great detail below, compressed air can be fed into the combustion chambers 120 and 122 to position the piston at a desired location in the cylinder 112.

Each feeding unit 14 and 16 can be fully integrated with each head unit 116 and 118 respectively, partially integrated with each head unit, or a completely separate assembly which interfaces with each head unit. Each feeding unit 14 and 16 includes an air intake valve 124 and a fuel injector 128 which control air and fuel flow into the combustion chambers. The air intake valve 124 and fuel injector 128 can include electromagnetic valves that are operated by the ECU 12 to feed the desired volume of compressed air and quantity of fuel at a desired timing.

Each exhaust unit 18 and 20 operate to evacuate each combustion chamber 120 and 122 respectively of compressed air and/or combustion gases. The ECU 12 operates each exhaust unit 18 and 20 to control the activation timing of each unit. Like the feeding units 14 and 16, the exhaust units 18 and 20 can be fully integrated with each head unit 116 and 118 respectively, partially integrated with each head unit, or a complete separate assembly which interfaces with each head unit. Further, the exhaust units 18 and 20 can include an electromagnetic valve or valves, as exhaust valves 127, that are operated by the ECU 12 to evacuate each combustion chamber 120 and 122 through an exhaust port at a desired timing.

Figure 2:
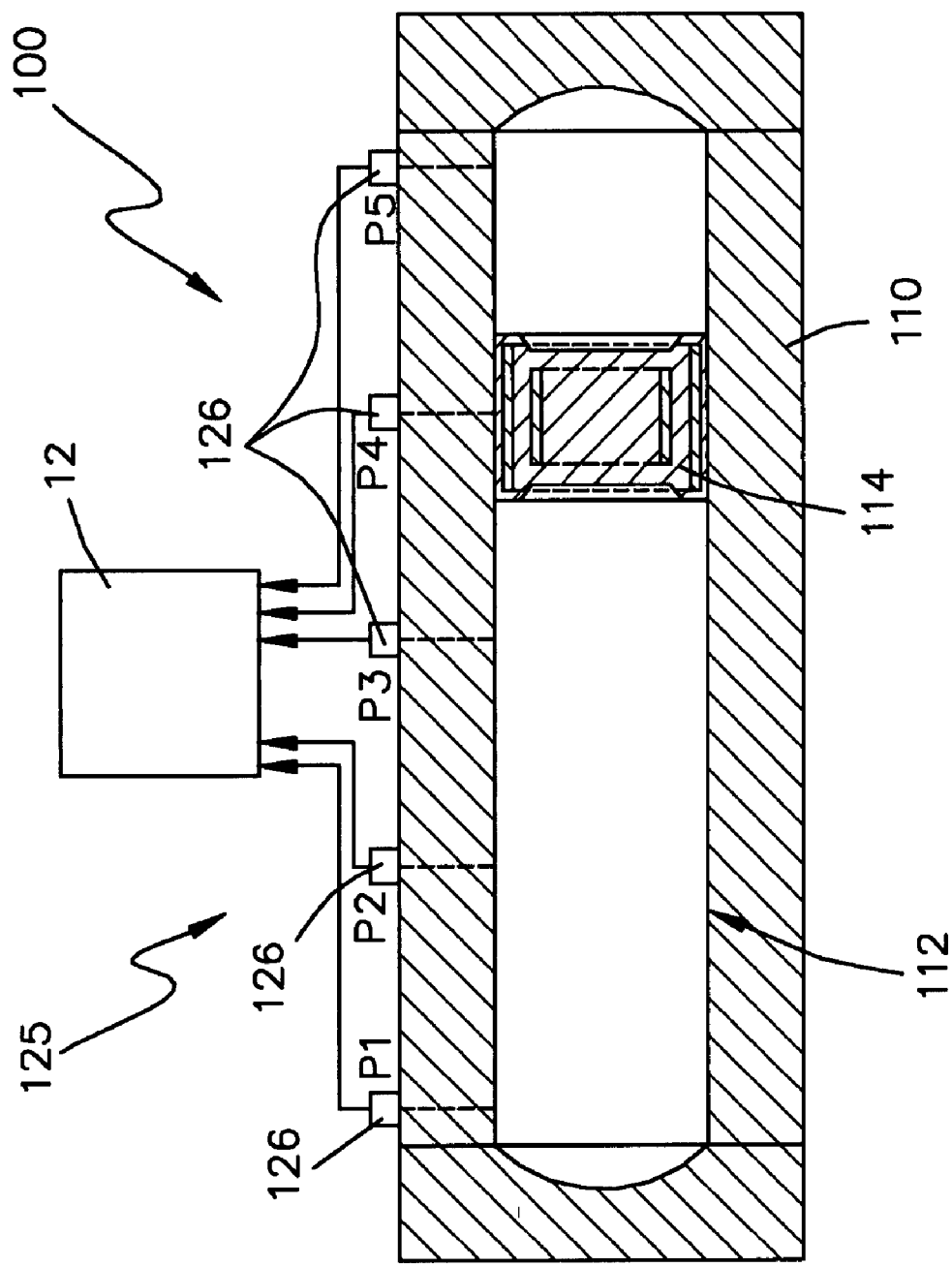
FIG. 2 is a schematic diagram of a piston position detecting means for detecting the longitudinal position, velocity and direction of the piston within the cylinder of the free piston engine.

With further reference to FIGS. 1 and 2, a piston detecting means 125 is positioned along the longitudinal length of the cylinder 112 and is connected to the ECU 12 to monitor piston position axially within the cylinder. In one embodiment, the piston detecting means 125 can include a plurality of sensor units 126 positioned along the longitudinal length of the cylinder 112 in a spaced relationship. Each sensor unit 126 operates to detect the piston 114 within a particular assigned axial region within the cylinder 112. Each sensor unit 126 generates an intermittent or constant signal containing information pertaining to the piston position within its assigned axial region. This piston position signal is received by the ECU 12, where it is processed along with the received signals from the other sensor units 126. The ECU 12 uses these signals to determine piston direction, velocity and position within the cylinder 112 and operates the first and second feeding units 14 and 16, the first and second exhaust units 18 and 20, and the first and second ignition plugs 22 and 24 accordingly to maintain a desired combustion sequence between the first and second combustion chambers 120 and 122 to reciprocate the piston 114 in the cylinder. Each sensor unit 126 can be a pressure sensor which operates to measure the pressure at a discrete location or within a discrete region within the cylinder 112. The measured pressures can than be used to determine piston position, direction and velocity. The combustion control process of the free piston engine 100 will be further described in more detail below. In the illustrated embodiment, five (5) pressure sensor units 126 are spaced along the length of the cylinder 112 and are numbered P1 to P5 in the direction from the first side of the cylinder or first combustion chamber 120 to the second side of the cylinder or second combustion chamber 122.

Figure 3:
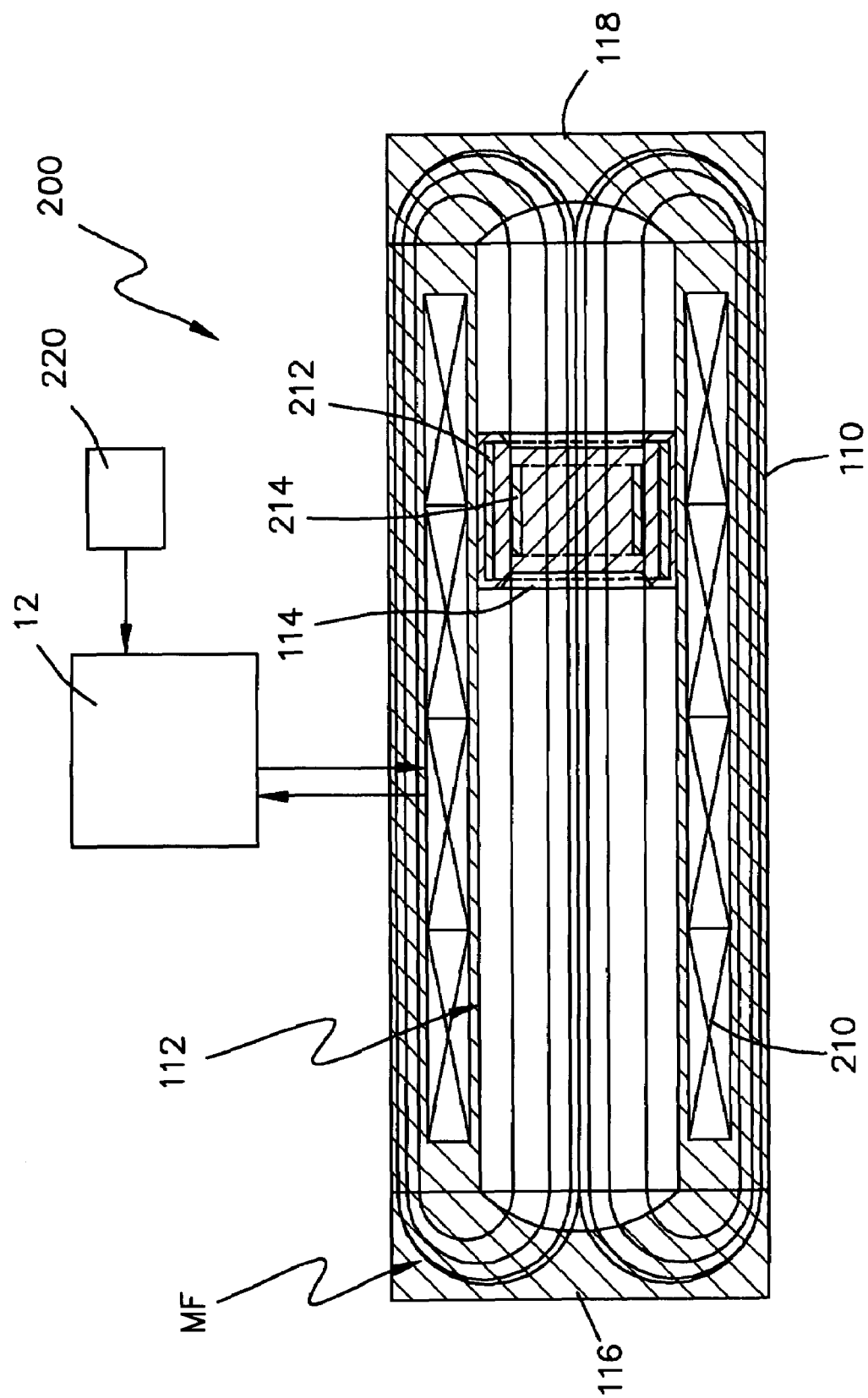
FIG. 3 is a schematic cross sectional view of the linear power generation system illustrating magnetic flux generated by a field coil or stator coil passing through the housing of the free piston engine.
Figure 4:
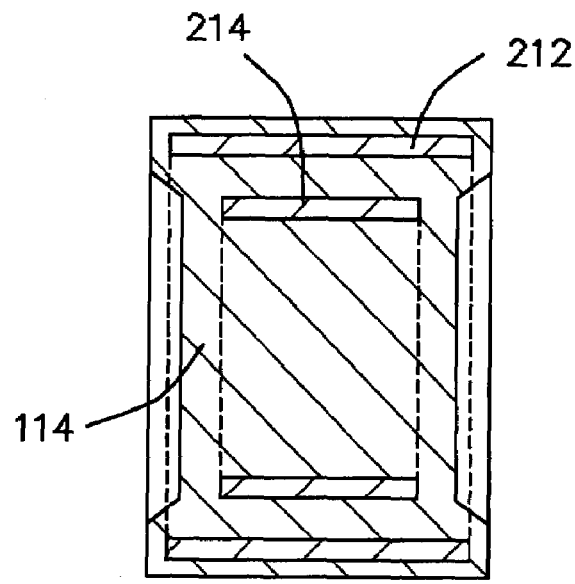
FIG. 4 is a schematic cross sectional view of a piston in accordance with one embodiment.

Turn back to FIG. 1, the linear motor generator 200 includes a movable member, as the piston 114, a stator or field winding 210 and a housing, as the free piston engine housing 110. The field winding 210 is arranged coaxially with and surrounds the cylinder 112 of the free piston engine. The field winding 210 can be a single coil or multiple coils connected in series. The field winding 210 extends about the longitudinal length of the cylinder 112. The field winding 210 is connected to an external source of electrical current 220 through the ECU 12. The ECU 12 operates to energize the field winding 210 with the external source of electrical current 220 intermittently or continuously to create a magnetic field or circuit which flows longitudinally through the housing 110, through each head unit 116 and 118 and axially through the cylinder 112, as best shown in FIGS. 3 and 4. In the case of multiple coils connected in series, the ECU 12 can operate to energize all or only one particular coil of the field winding 210. The housing 110 and each head unit 116 and 118 are comprised of a feroceramic material or the like having a desired magnetic permeability which allows the magnetic field or flux to flow easily through the housing and each head unit.

With reference to FIGS. 3 and 4, the piston 114 is also constructed of a feroceramic material permitting the magnetic field MF to flow through the piston body without a considerable resistance. A secondary coil 212 is integrated with and carried by the piston 114. The secondary coil 212 is coaxially aligned with the piston 114 and thus with the cylinder 112 and field winding 210 as well. The diameter of the secondary coil 212 is such that the magnetic flux flowing axially along the cylinder 112 is substantially passed through the interior periphery of the secondary coil. The flux of the field winding 210 flowing across the secondary coil 212 induces a current within the secondary coil resulting in the secondary coil generating a magnetic field itself (not illustrated). The secondary coil 212 can be a single or multiple winding coil. In one embodiment, the secondary coil 212 is a single winding coil of a sheet of electrically conductive material having a width greater than its thickness. A second secondary coil 214 or multiple secondary coils can be integrated with or carried by the piston 114 each operating in the same manner as the first secondary coil 212.

Figure 6:
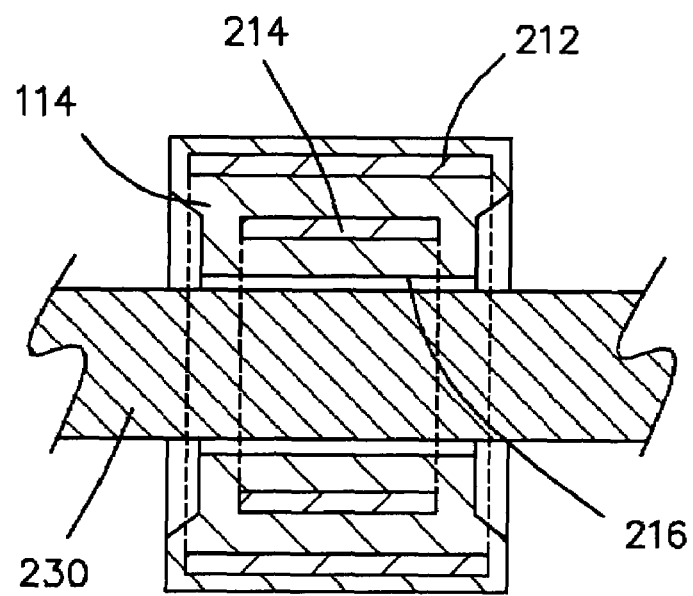
FIG. 6 is a schematic cross sectional view of a piston in accordance with a second embodiment.
Figure 5:
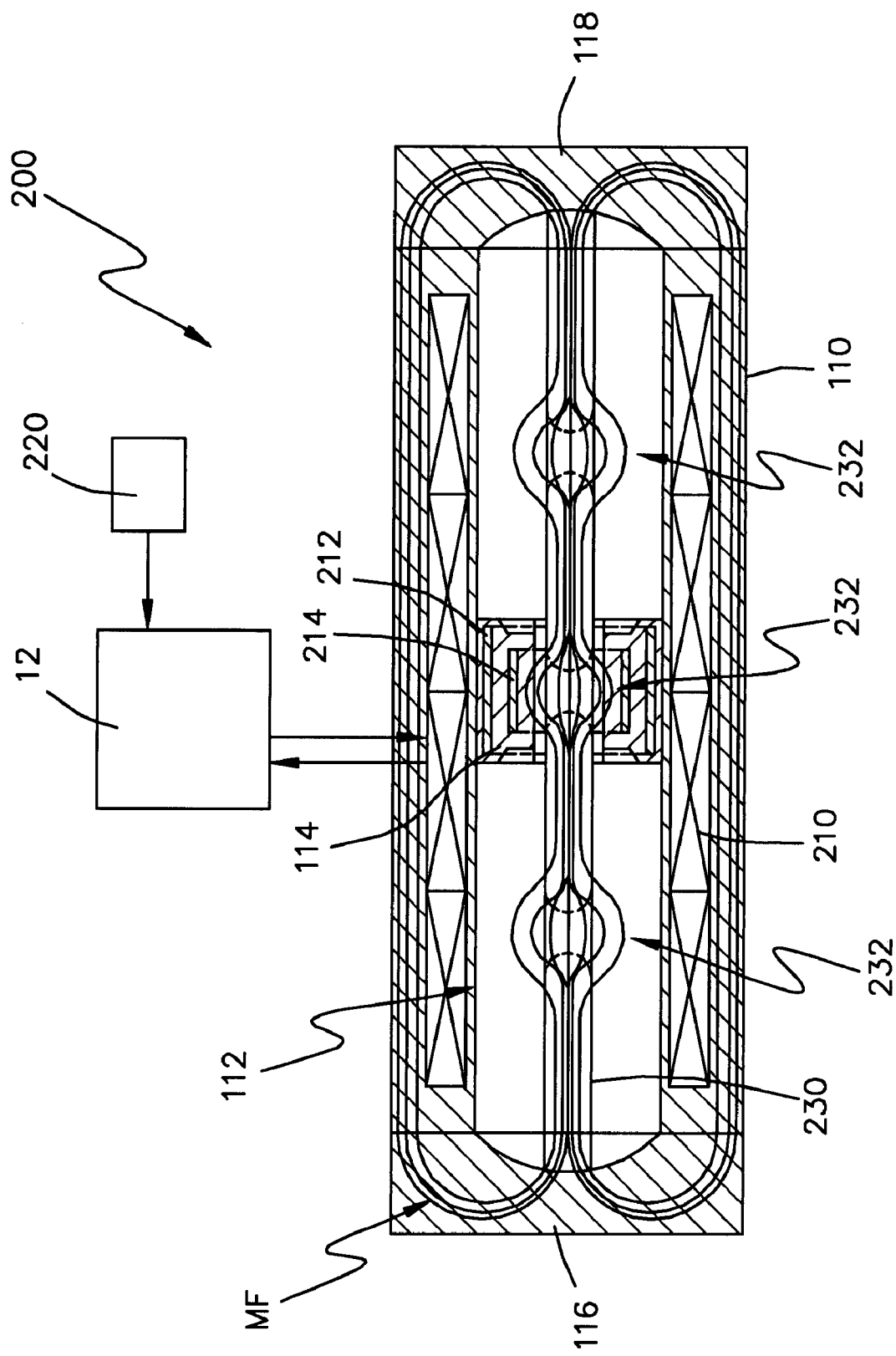
FIG. 5 is a schematic cross sectional view of the linear power generation system illustrating magnetic flux generated by a field coil or stator coil passing through the housing of the free piston engine and a flux guide bar positioned axially within the cylinder of the housing.

Turning now to FIGS. 5 and 6, a magnetic flux guide bar 230 can be included, which is positioned coaxially with the cylinder 112 and extends the longitudinal length of the cylinder 112 where it is connected to each head unit 116 and 118 at opposite ends. In this arrangement, the piston 114 includes an axial bore 216 through which the guide bar 230 is passed. The interior diameter of the through bore 216 is greater than the exterior diameter of the guide bar 230 such that no physical contact is made between the piston 114 and the guide bar 230. The guide bar 230 is constructed of a material having a high magnetic permeability, such as a feroceramic. The guide bar 230 acts to attract the magnetic flux of the field winding 210 flowing axially through the cylinder 112 and to increase the density of the magnetic flux about the longitudinal axis of the cylinder. Increasing the density of magnetic flux of the field winding 210 about the longitudinal axis of the cylinder 112 increases the magnetic flux that is passed through the interior periphery of the secondary coil 212 or coils, which increases the current induced in the coil resulting in a stronger magnetic field generated by the secondary coil.

The magnetic flux guide bar 230 can include axially alternating regions of a lower density of ferromagnetic material and a higher density of ferromagnetic material. These alternation regions of densities of ferromagnetic material causes the density of magnetic flux flowing through the guide bar 230 to change between each region, as best shown in FIG. 5. In the regions with less ferromagnetic material, the density of magnetic flux reduces resulting in expansion of the flux flow in these regions as indicated at 232. The alternating density zones of magnetic flux increases the interaction between the magnetic flux of the field winding 210 and the magnetic field of the secondary coil 212 or coils, as will be further described below.

Now operation of the power generation system 10 will be explained. The free piston engine 100 can operate as a two-stroke or four-stroke engine. However, only the two-stroke operation of the free piston engine 100 will be explained. While the piston axially reciprocates one time, a compression stroke of compressing and igniting, and an expansion stroke of combustion and exhausting take place in both the first and second combustion chambers 120 and 122. The compression stroke and expansion stroke being opposite between the first and second combustion chambers 120 and 122. In other words, as the piston 114 undergoes a compression stroke in the first combustion chamber 120, the piston undergoes the expansion stroke in the second combustion chamber 122 and vis-versa. These oppositely phased strokes of the piston 114 between the first and second combustion chambers 120 and 122 reciprocate the piston between each combustion chamber. The particular physics of internal combustion is well known in the art and will not be discussed here in great detail.

The position of the piston 114 where the first side of the piston is moved the most towards the first combustion chamber 120 is referred to as "first top dead center" and the position of the piston where the second side of the piston is moved the most towards the second combustion chamber 122 is referred to as "second top dead center". Likewise, the position of the piston 114 where the first side of the piston is moved the most away from the first combustion chamber 120 is referred to as "first bottom dead center" and the position of the piston where the second side of the piston is moved the most away from the second combustion chamber 122 is referred to as "second bottom dead center". Piston stroke is referred to the linear distance between the first top dead center and the second top dead center. Or in other terms, stroke can be defined as the linear distance between the first top dead center and first bottom dead center and the linear distance between the second top dead center and second bottom dead center. The linear distance between first top dead center and first bottom dead center is referred to as first piston stroke and the linear distance between second top dead center and second bottom dead center is referred to as second piston stroke. An important aspect of the free piston engine 100 of the present invention is the ability to adjust piston stroke, first piston stroke and second piston stroke to provide a free piston engine having variable stroke. It is possible with the construction of the free piston engine 100 of the present invention for the first and second piston strokes to be unequal, i.e. first top dead center and second top dead center may be of different distances. The importance of this variable stroke construction will become apparent with further discussion of the operation of the power generation system 10.

Combustion in each combustion chamber 120 and 122 is effected through control of the first and second feeding units 14 and 16, the first and second exhaust units 18 and 20, and the first and second ignition plugs 22 and 24 by the ECU 12. The ECU 12 utilizes information gained from the piston position detecting means 125 to effect the timing of combustion in each combustion chamber 120 and 122 and the piston stroke. The ECU 12 can operate to adjust the piston stroke, piston velocity and direction by adjusting the timing of the various aspects of internal combustion in each combustion chamber 120 and 122.

Now, one control scheme for effecting operation of free piston engine 100 be described. In this control scheme there are three separate cycles including a priming cycle, and first and second combustion cycles. The priming cycle is only performed once per each instance of engine start. Once the free piston engine 100 is started, the engine cycles between the first and second combustion cycles. Further, each combustion cycle has an initial phase, a transition phase and an end phase during which each sensor unit 126 measures pressure along the longitudinal length of the cylinder 112 to determine piston position, velocity and direction. Changes in measured pressure along the cylinder 112 allows the ECU 12 to determine which phase each combustion cycle is in and to effect the timing of each combustion cycle.

During the priming cycle, the ECU 12 operates the first and second feeding units 14 and 16 and the first and second exhaust units 18 and 20 to position the piston 114 from any longitudinal position within the cylinder 112 to a desired position within the cylinder, to index the piston position and to ready the engine to begin the combustion cycles. For example, the priming cycle operates to position the piston 114 at a desired first top dead center position. In the alternative, the piston 114 could be positioned to be at a desired second top dead position.

The piston 114 in position at first top dead center, the first combustion cycle is ready to begin. During the initial phase of the first combustion cycle, the first exhaust unit 18 is closed and second exhaust unit 20 is open. The ECU 12 operates the first feeding unit 14 to inject compressed air and fuel into the first combustion chamber 120 and the first ignition plug 22 to ignite the air-fuel mixture. During the initial phase of the first combustion cycle sensor unit P1 indicates a high pressure and each sensor unit P2-P5 indicate a low pressure. Once the piston 114 begins to move as a result of igniting the air-fuel mixture in the first combustion chamber 120, the transition phase of the first combustion cycle begins. During the transition phase, the piston 114 translates within the cylinder 112 from first top dead center to second top dead center. As the piston 114 moves from first top dead center to second top dead center, pressure measured at sensor units P2 and P3 increases. Once sensor units P1, P2 and P3 indicate high pressure and sensor units P4 and P5 remain to indicate low pressure, the first combustion cycle enters into the end phase. During the end phase, the first exhaust unit 18 opens and the second exhaust unit 20 closes.

At this point, the initial phase of the second combustion cycle begins. The ECU 12 operates the second feeding unit 16 to inject compressed air and fuel into the second combustion chamber 122 and the second ignition plug 24 to ignite the air-fuel mixture in the second combustion chamber 122. During the initial phase of the second combustion cycle, sensor unit P5 indicates a high pressure and each sensor unit P4-P1 indicate a low pressure. Once the piston begins to move as a result of igniting the air-fuel mixture in the second combustion chamber 122, the transition phase of the second combustion cycle begins. During the transition phase, the piston translates within the cylinder 112 from the second top dead center to the first top dead center. As the piston 114 moves from second top dead center to first top dead center, pressure measured at sensor units P4 and P3 increases. Once sensor units P5, P4 and P3 indicate high pressure and sensor units P2 and P1 remain to indicate low pressure, the second combustion cycle enters into the end phase. During the end phase, the second exhaust unit 20 opens and the first exhaust unit 18 closes. The above described strokes are repeated, so that the free piston engine 100 continues to operate.

It is important to note, the end phase and the initial phase of each combustion cycle overlap respectively. For example, as the first combustion cycle begins to enter the end phase, the second combustion cycle begins to enter the initial phase. The time duration of this overlap can be controlled by the ECU 12 resulting in a shorter or longer piston stroke. More specifically, from the above discussion, a high pressure reading from sensor unit P3 indicates a transition from the transition and the end phase of each combustion cycle. The ECU 12 can operate the free piston engine 100 to maintain sensor P3 at a high reading for a desired time duration thus delaying the completion of the transition phase. The longer the time duration or the longer the delay, the further the piston will travel in the cylinder before the end phase of the particular combustion cycle is entered and the initial phase of the subsequent combustion cycle is entered. The time duration can be controlled by the ECU 12 to accurately control the top dead center and bottom dead center position of the piston in each combustion cycle, and thus piston stroke.

Next the operation of the linear motor generator 200 will be explained. The ECU 12 operates to synchronize energizing the field winding 210 with the external source of electrical current 220 with the reciprocation of the piston 114 in the cylinder 112 during operation of the free piston engine 100. The energized the field winding 210 generates a magnetic field as discussed above. This magnetic field flows axially through the cylinder 112 and the secondary coil 212 or coils inducing an electrical current in the secondary coil or coils. The energized secondary coil 212 generates a second magnetic field (not shown) opposing the first magnetic field generated by the field winding 210. Upon relative movement of the secondary coil 212 and the piston 114 with the field winding 210, a voltage is induced in the field winding in accordance with well known principles, whereby electrical energy can be coupled out. A power generating device is then made, which is based upon the principle of free piston guidance of the piston 114.

The source of external electrical current 220 can be an alternating current (AC) source, a direct current (DC) source. It is also possible to apply a square wave form current source to energize the field coil 210. In this case the wave form would be synchronized with the motion of the secondary coil carrying piston 114.

A number of embodiments of the present invention have been described. Nevertheless, it will be understood that various modifications may be made without departing from the spirit and scope of the invention. Accordingly, other embodiments are within the scope of the following claims.

I claim:

1. A power generating system comprising:
   a housing having a cylinder and first and second combustion chambers at opposed ends of said cylinder;
   a piston having opposed first and second ends, said piston is contained within said cylinder with said first end facing said first combustion chamber and said second end facing said second combustion chamber, said piston capable of being axially reciprocated between said first and second combustion chambers, said piston being of a material that is permeable to magnetic flux and is electrically insulative;
   a first coil being carried by said piston and arranged coaxially therewith;
   a second coil surrounding said cylinder and being coaxially aligned therewith;
   a source of external electric current at least intermittently connected to said second coil; and
   wherein combustion is effected in said first and second combustions chambers in an alternating pattern to cause said piston to reciprocate within said cylinder, thereby generating electric current in said second coil.

2. The power generating system of claim 1, further comprising:
   a piston position detecting means for detecting the axial position of said piston within said cylinder and generating a position signal;
   a controller, said controller receiving said position signal and operating to control the combustion in said first and second combustion chambers as a function of piston position.

3. The power generating system of claim 1, further comprising:
   a plurality of pressure sensors spaced longitudinal along said cylinder, each of said plurality of pressure sensors for generating a pressure signal in response to measured pressure within said cylinder at its respective location along said cylinder; and
   a controller, said controller receiving each pressure signal generated by each of said plurality of pressure sensors and operating to control the combustion in said first and second combustion chambers as a function.

4. The power generating system of claim 3, further comprising
   a first feeding unit that feeds compressed air and fuel into said first combustion chamber;
   a first exhaust unit that discharges gases from said first combustion chamber;
   a second feeding unit that feeds compressed air and fuel into said second combustion chamber;
   a second exhaust unit that discharges gas from said second combustion chamber; and
   wherein said controller operates said first and second feeding units, and first and second exhaust units.

5. The power generating system of claim 3, further comprising:
   a piston stroke controller for generating a stroke length command signal to said controller; and
   wherein said controller compares said stroke length command signal to at least one of said pressure signals to control the stroke length of said double-ended piston.

6. The power generating system of claim 1, further comprising:
   a third coil being carried by said piston and arranged coaxially therewith and being concentric with said first coil.

7. The power generating system of claim 1, wherein said piston is of a feroceramic material.

8. The power generating system of claim 1, wherein said source of external electrical current is a direct current source.

9. The power generating system of claim 1, wherein said source of external electrical current is an alternating current source.

10. The power generating system of claim 1, further comprising:
    at least a fourth coil connected in series to said second coil and surrounding said cylinder and coaxially aligned therewith.

11. The power generating system of claim 10, wherein said source of electrical current is at least intermittently connected to said second coil or said at least a fourth coil.

12. The power generating system of claim 1, further comprising:
    a magnetic flux guide extending the length of said cylinder and being coaxially aligned therewith; and
    wherein said piston includes a longitudinal axial bore extending therethrough from said first end to said second end, and said magnetic flux guide passing through said longitudinal bore.

13. The power generating system of claim 12, wherein said magnetic flux guide includes areas of alternating density of feroceramic material.

14. The power generating system of claim 1, further comprising:
    a magnetic flux guide extending the length of said cylinder and being coaxially aligned therewith, said magnetic flux guide having axially alternating regions of different feroceramic density; and
    wherein said piston includes a longitudinal axial bore extending therethrough from said first end to said second end, and said magnetic flux guide passing through said longitudinal bore.

15. A power generating system comprising:
    a housing having a cylinder and first and second combustion chambers at opposed ends of said cylinder;
    a piston having opposed first and second ends, said piston is contained within said cylinder with said first end facing said first combustion chamber and said second end facing said second combustion chamber, said piston capable of being axially reciprocated between said first and second combustion chambers, said piston being of a material that is permeable to magnetic flux and is electrically insulative;
    a first coil being carried by said piston and arranged coaxially therewith;
    a second coil being carried by said piston and arranged coaxially therewith and concentric with said first coil;
    a third coil surrounding said cylinder and being coaxially aligned therewith;
    a source of external electric current at least intermittently connected to said third coil;
    a plurality of pressure sensors spaced longitudinal along said cylinder, each of said plurality of pressure sensors for generating a pressure signal in response to measured pressure within said cylinder at its respective location along said cylinder; and
    a controller, said controller receiving each pressure signal generated by each of said plurality of pressure sensors and operating to control the combustion in said first and second combustion chambers in an alternating sequence as a function of cylinder pressure cause said piston to reciprocate within said cylinder, thereby generating electric current in said third coil.

16. The power generating system of claim 15, further comprising
    a first feeding unit that feeds compressed air and fuel into said first combustion chamber;
    a first exhaust unit that discharges gases from said first combustion chamber;
    a second feeding unit that feeds compressed air and fuel into said second combustion chamber;
    a second exhaust unit that discharges gas from said second combustion chamber; and
    wherein said controller operates said first and second feeding units, and first and second exhaust units.

17. The power generating system of claim 15, further comprising:
    a piston stroke controller for generating a stroke length command signal to said controller; and
    wherein said controller compares said stroke length command signal to at least one of said pressure signals to control the stroke length of said double-ended piston.

18. The power generating system of claim 15, wherein said piston is of a feroceramic material.

19. The power generating system of claim 15, wherein said source of external electrical current is a direct current source.

20. The power generating system of claim 15, wherein said source of external electrical current is an alternating current source.

* * * * *